Feb. 10, 1953 D. L. BLANEY 2,628,288

COMBINATION SOUND RECORDING AND RECORD

Filed May 19, 1949

INVENTOR.
DOROTHY L. BLANEY
BY Val R. Goshaw
ATTORNEY

Patented Feb. 10, 1953 2,628,288

UNITED STATES PATENT OFFICE 2,628,288

COMBINATION SOUND RECORDING AND RECORD

Dorothy L. Blaney, Los Angeles, Calif., assignor to Radio Corporation of America, a corporation of Delaware Application May 19, 1949, Serial No. 94,065

12 Claims. (Cl. 179—100.3)

This invention relates to combination magnetic and photographic records and equipment for recording and reproducing these records.

Magnetic records and apparatus for recording and reproducing magnetic records are well-known. One of the present methods of recording magnetic records now in general use is to impress variations in magnetic field strength longitudinally of a wire, steel tape, or a film coated with finely divided magnetic particles. Reproduction is accomplished by introducing into a coil, wound on a core, flux variations corresponding to the magnetism induced in the magnetic material during recording. However, since this form of recording and reproducing is being used in the production of sound motion pictures, the normal phonograph type of record and equipment is not adequate to perform all the functions required, since the equipment now in motion picture use is for photographic recording and reproduction. In the making of motion pictures, it is desirable to provide a sound record which may be immediately reproduced to determine the quality of the "take" and whether or not it is satisfactory for later combination with the picture. To accomplish this result, the present invention is directed to the simultaneous recording of a photographic and a magnetic track at the same points longitudinally of the film and spaced transversely of the film, so that when one track is edited, editing of the other track will be automatically accomplished.

In Blaney U. S. Patent No. 2,235,513 of March 18, 1941, a method of and system for recording a negative type of photographic sound track and a direct positive type of photographic sound track on the same film and of the same sound waves, has been disclosed and claimed, the direct positive track being directly reproducible after the film has been processed. The present invention simultaneously produces two sound tracks, one photographic, and the other magnetic, on the same film. The recordings may be either of the same sound waves or of sound waves from two independent sources. When the two sound records are of the same sound signal, it is possible to determine immediately after the recording, by reproducing the magnetic record, which is immediately reproducible, whether or not the photographic track may be marked "satisfactory" and processed. If not, that particular sound sequence may be marked "no good" and it may be removed from the reel, and thus, not processed. Furthermore, the invention permits reproduction during recording, which both checks the sound sequence and provides monitoring.

In the production of sound motion pictures, foreign versions having foreign language sound tracks are produced. In many instances, the sound track for the film to be used in a foreign language country is recorded with only the sound effects, without the dialogue, the dialogue being added later in a rerecording process. The present invention provides two forms of combination photographic and magnetic records which will permit the same print to be used in several foreign language countries. In one modification, a magnetic track is provided adjacent and parallel to the photographic track. The photographic track contains the sound effects, and the magnetic track contains the dialogue. Thus, when it is desired to use the print in another country having a different language, it is only necessary to erase the magnetic track and add the dialogue in the same position in the new language. This combination sound record may also be in the form of a variable area, bilateral photographic track, through the center of which is placed a strip of magnetic material on which the dialogue may be recorded.

The principal object of the invention, therefore, is to facilitate the recording and reproduction of sound for motion picture production.

Another object of the invention is to provide duplicate sound records on the same recording medium, one of which is suitable for immediate reproduction.

A further object of the invention is to provide a new form of sound record for motion picture film.

A still further object of the invention is to provide an improved system for recording a plurality of sound records, each of which may contain different portions of the complete sound record.

A still further object of the invention is to provide an improved system for determining the condition of a recorded sound sequence either immediately after the recording or during the recording, the latter also providing monitoring.

Although the novel features which are believed to be characteristic of this invention will be pointed out with particularity in the appended claims, the manner of its organization and the mode of its operation will be better understood by referring to the following description, read in conjunction with the accompanying drawings, forming a part hereof, in which:

Figures 1, 2, 3, 4:
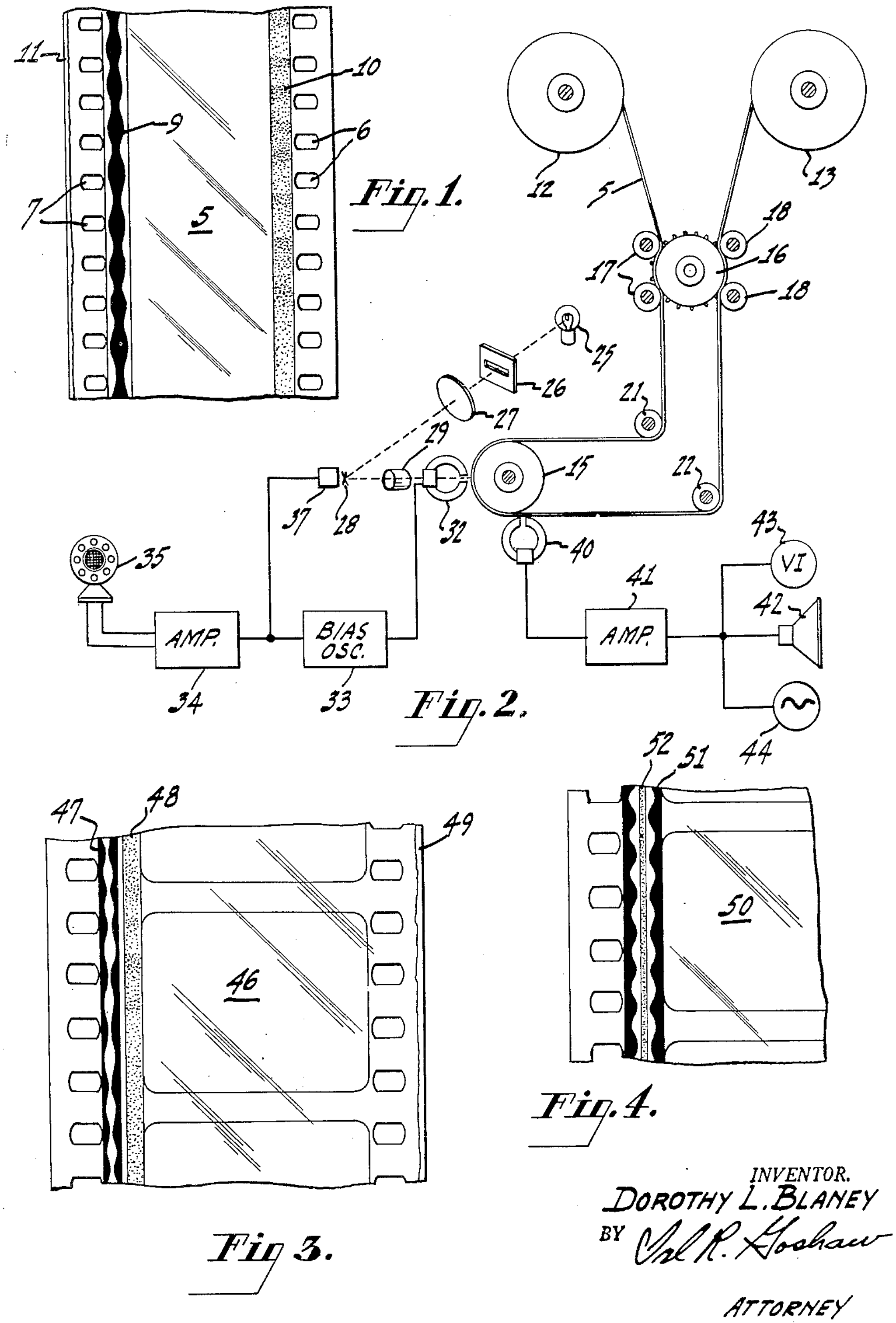
Fig. 1 is a sectional view of a motion picture sound film showing one combination of records.
Fig. 2 is a diagrammatic view of a recording system for recording the records shown in Fig. 1 and for reproducing one of said records.
Fig. 3 is a sectional view of a motion picture film having one form of double record thereon.
Fig. 4 is a sectional view of a motion picture film having another form of combination sound record thereon.

Referring now to the drawings, the film record medium 5 is shown having a double row of sprocket holes 6 and 7 with any suitable photographic type of record, such as a variable area, bilateral record 9 along one row of sprocket holes, and a magnetic type of record 10 along the other row of sprocket holes. The magnetic record material may be applied directly over the normal film emulsion, and a narrow strip 11 of the same thickness may be applied to the opposite edge of the film so the film will wind uniformly on a reel. The film 5 is fed from a supply reel 12 and taken up by a take-up reel 13, the film being advanced over a recording drum 15 by a sprocket 16 having pad rollers 17 and 18. Guide rollers 21 and 22 are shown between the drum 15 and the sprocket 16, these rollers being either fixed or resiliently mounted, as is well-known in the art.

For recording the photographic record 9 on the left-hand edge of the film, a light source 25, aperture plate 26, lens 27, galvanometer 37 with mirror 28, and slit mask and projection unit 29 are employed. This type of variable area recording system is well-known, and may be any one of the standard commercial types.

Positioned along the other edge of the film to produce the magnetic record 10, is a recording head 32, which is connected through a bias oscillator 33 to amplifier 34 and a signal source, such as a microphone 35. The output of amplifier 34 is connected to the galvanometer 37. Thus, the signal, as picked up by microphone 35, is simultaneously impressed on the galvanometer 37 and the magnetic recording head 32, which results in the recording of the two records 9 and 10. Thus, duplicate records are obtained of the same signal at the same point longitudinally of the film, so that when the film is cut at a certain longitudinal point along one of the records, it will also cut the film at the same point on the other record. The galvanometer 37 could be connected to one signal source, and the head 32 to a separate source, if desired.

To determine whether or not a sound sequence is satisfactory for later use with the picture, the film 5 may be rewound to the beginning of the sequence and then immediately reproduced by a reproducing head 40 connected to an amplifier 41 and a loudspeaker 42, volume indicator 43, and/or an oscillograph 44. Also, the magnetic record may be simultaneously reproduced during the recording, thus providing a monitoring system which would permit the determination of the quality of the recording at the time the record is recorded.

In the systems of Figs. 1 and 2, the magnetic record is placed along one edge of the film and the photographic record along the other edge of the film, which permits the recording head 32 to be placed directly opposite the photographic recording point. However, for later combination, the magnetic record may be placed along the same edge of the film, as shown in Fig. 3, the photographic record on the picture film 46 being shown at 47 and the magnetic record at 48. A narrow strip 49 is also provided to permit uniform winding. This arrangement of records is suitable for use in foreign versions, whereby the photographic record 47 may carry the background effects, while the magnetic record 48 carries the dialogue. The two records are reproduced simultaneously, the dialogue reproducing point being displaced from the corresponding sound effects point as is now done with the picture projection point with respect to the photographic sound translating point.

If it is desired to change the language of the dialogue, it is only necessary to erase the magnetic dialogue record and replace it with a new dialogue record in the desired foreign language. The two tracks 47 and 48 may be one-half the normal width of the normal photographic record area, or they may be slightly widened at the expense of the picture area. However, two tracks within the same record area may be provided as shown in Fig. 4, wherein, on the film 50, a variable area, bilateral photographic record 51 is made in the normal way, except all modulations lie outside of a constant width center area 52, which is a magnetic strip attached to the film. This record may be used in the same manner as the record on film 46, the light beam, of course, being reduced by a constant amount by the parallel strip of magnetic material 52.

Thus, there is provided, by the type of record shown in Fig. 1, a system which will provide an immediate check on the quality and condition of the sequence during the actual recording thereof or immediately thereafter. If the recording is unsatisfactory, the photographic portion of the film need not be processed for later printing. If the sequence is satisfactory, it can then be spliced to other satisfactory sequences for processing the negative photographic sound track, which will be printed to the final composite sound track with the picture.

Furthermore, by the use of the combination types of sound tracks shown in Figs. 3 and 4, the same print will serve for showing in countries having different foreign languages simply by erasing the old dialogue magnetic track and recording a new dialogue magnetic track thereon. With two tracks, such as shown in Figs. 3 and 4, each track may contain all the sound required for the picture, one, however, being in one language, and the other, in another language. The reproducing equipment only requires a magnetic reproducing head in addition to the standard photographic head, so that either type of record may be reproduced during the projection of the picture.

I claim:

1. A sound recording system comprising means for simultaneously recording a photographic record and a magnetic record on the same film of the same sound waves, and means for simultaneously reproducing said magnetic record for monitoring said photographic record.

2. A sound recording system comprising means for recording sound waves as a photographic record, means for simultaneously recording said sound waves as a magnetic record on the same film at the same point longitudinally of the film, the points of recording said records being oppositely disposed transversely of said film, and means for simultaneously reproducing said magnetic record for monitoring said photographic record.

3. A sound recording system comprising means for simultaneously recording a photographic record and a magnetic record on the same film of the same sound waves, and means for simultaneously reproducing said magnetic record for monitoring said photographic record during the recording thereof.

4. A motion picture film, comprising a base having a picture portion, a photographic sound record portion between said picture portion and one edge of said film, and a magnetic sound record portion adjacent said picture portion, all of said portions being on the same side of said film.

5. A picture film in accordance with claim 4, in which said photographic record portion and said magnetic record portion lie adjacent one another along the same edge and on the same side of said film.

6. A picture film in accordance with claim 4, in which said magnetic record portion is superimposed upon said photographic record portion on the same side of said film and permanently attached thereto.

7. A sound recording system, comprising means for recording sound waves as a photographic sound record upon a film, means for simultaneously recording said sound waves as a magnetic record at the same point longitudinally of said film and oppositely disposed from said first record transversely of said film, and means for simultaneously reproducing said magnetic record for monitoring said photographic record during the recording thereof.

8. A sound recording system, comprising a film having a photographic emulsion and a magnetic medium thereon, means for advancing said film past a pair of sound recording points, means for photographically recording a photographic sound record of a signal at one of said points, means for magnetically recording a magnetic sound record of said signal at the other of said points, and means for simultaneously reproducing said magnetic record for monitoring said photographic record.

9. A sound recording system in accordance with claim 8, in which said photographic recording means including a modulated light beam, and said magnetic recording means including a magnetic head having a gap located at the same position longitudinally of the film as said light beam.

10. A picture film in accordance with claim 4, in which both of said sound record portions carry records of the same sound waves.

11. A picture film in accordance with claim 4, in which said photographic sound record portion carries the sound effects and the magnetic sound record portion carries the dialogue of sound accompanying the picture on said picture portion.

12. A picture film in accordance with claim 6, in which said photographic sound record portion carries the sound effects and the magnetic sound record portion carries the dialogue of sound accompanying the pictures on said picture portion.

DOROTHY L. BLANEY.

REFERENCES CITED

The following references are of record in the file of this patent:

UNITED STATES PATENTS

| Number | Name | Date |
|---|---|---|
| 2,235,513 | Blaney | Mar. 18, 1941 |
| 2,479,868 | Rossman | Aug. 23, 1949 |
| 2,479,869 | Rossman | Aug. 23, 1949 |
| 2,480,162 | Rath | Aug. 30, 1949 |